(12) United States Patent
Pokhil et al.

(10) Patent No.: US 11,846,609 B2
(45) Date of Patent: Dec. 19, 2023

(54) ELECTRIC ACTUATOR

(71) Applicant: MTS Systems Corporation, Eden Prairie, MN (US)

(72) Inventors: Dmitrii Pokhil, Arden Hills, MN (US); Byron Saari, Minneapolis, MN (US); Charles Groepper, Waconia, MN (US); Paul Carroll, Eden Prairie, MN (US)

(73) Assignee: MTS Systems Corporation, Eden Prairie, MN (US)

( * ) Notice: Subject to any disclaimer, the term of this patent is extended or adjusted under 35 U.S.C. 154(b) by 373 days.

(21) Appl. No.: 17/069,498

(22) Filed: Oct. 13, 2020

(65) Prior Publication Data

US 2021/0108998 A1 Apr. 15, 2021

Related U.S. Application Data

(60) Provisional application No. 63/090,597, filed on Oct. 12, 2020, provisional application No. 62/914,546, filed on Oct. 13, 2019.

(51) Int. Cl.
*G01N 3/04* (2006.01)
*G01N 3/08* (2006.01)
*G01N 3/02* (2006.01)

(52) U.S. Cl.
CPC .................. *G01N 3/02* (2013.01); *G01N 3/08* (2013.01)

(58) Field of Classification Search
CPC .......... G01M 7/06; G01M 13/02; G09B 9/02; G03F 7/70691; G03F 7/70758;
(Continued)

(56) References Cited

U.S. PATENT DOCUMENTS

| 3,579,001 A | 5/1971 | Pelene |
| 5,225,725 A | 7/1993 | Shiraki et al. |

(Continued)

FOREIGN PATENT DOCUMENTS

| DE | 102014213276 A1 | 1/2016 |
| JP | 2004129316 A | 4/2004 |
| WO | 2014079520 A2 | 5/2014 |

OTHER PUBLICATIONS

International Serach Report and Written Opinion in corresponding International Application No. PCT/US2020/055398, dated Jan. 28, 2021.

(Continued)

*Primary Examiner* — Brandi N Hopkins
(74) *Attorney, Agent, or Firm* — Steven M. Koehler; Westman, Champlin & Koehler, P.A.

(57) ABSTRACT

An electric actuator includes a stationary support and a guide system having a single stationary guide joined to the stationary support having an axis. The actuator also includes a stationary assembly secured to the stationary support. A moving assembly is movable relative to the stationary support on the guide, where the moving assembly and the stationary assembly provide at least two sets of interacting magnetic fields disposed about the guide at equal angular intervals. A test specimen support is joined to the moving assembly and disposed on one side of the stationary support so as to move along the axis with movement of the moving assembly, the axis extending through the test specimen support.

19 Claims, 11 Drawing Sheets

(58) Field of Classification Search
CPC ...... G01B 5/0002; G01B 11/26; G01N 19/02; G01N 3/56; G01N 3/08; G01N 3/02; G01N 1/06; G11B 21/08; G11B 5/5521; B66F 3/247; G12B 5/00; H01F 7/1615; H01L 21/68; H01L 21/67259; B23K 26/046; H02K 41/02; H02K 41/03; H02K 41/031; G01R 31/28; G02B 7/003
See application file for complete search history.

(56) References Cited

U.S. PATENT DOCUMENTS

| | | |
|---|---|---|
| 5,486,727 A | 1/1996 | Heidelberg et al. |
| 5,723,917 A | 3/1998 | Chitayat |
| 5,767,402 A | 6/1998 | Sandlass et al. |
| 6,160,327 A | 12/2000 | Wang |
| 6,663,664 B1 | 12/2003 | Pacetti |
| 6,940,190 B2 | 9/2005 | Jobson et al. |
| 6,977,450 B2 | 12/2005 | Asou et al. |
| 7,218,019 B2 | 5/2007 | Potter |
| 9,716,416 B2 | 7/2017 | Bobelis et al. |
| 9,797,943 B2 * | 10/2017 | Kuhlmann ............ G01R 31/28 |
| 2006/0138874 A1 | 6/2006 | Janisiewicz et al. |
| 2018/0166196 A1 | 6/2018 | Simon et al. |
| 2018/0301970 A1 | 10/2018 | Hartramph et al. |

OTHER PUBLICATIONS

"Aerotech Linear Motors", Jul. 12, 2017, pp. 1-24, retrieved from https://web.archive.org/web/20170712013245if_/ https://www.aerotech.com/media/370725/ca0117a-linear-motors-brochure.pdf.

Zhu et al., "Modal Analysis of a Servo-Hydraulic High Speed Machine and its Application to Dynamic Tensile Testing at an Intermediate Strain Rate", Experimental Mechanics, Oct. 2011, pp. 1347-1363, vol. 51.

* cited by examiner

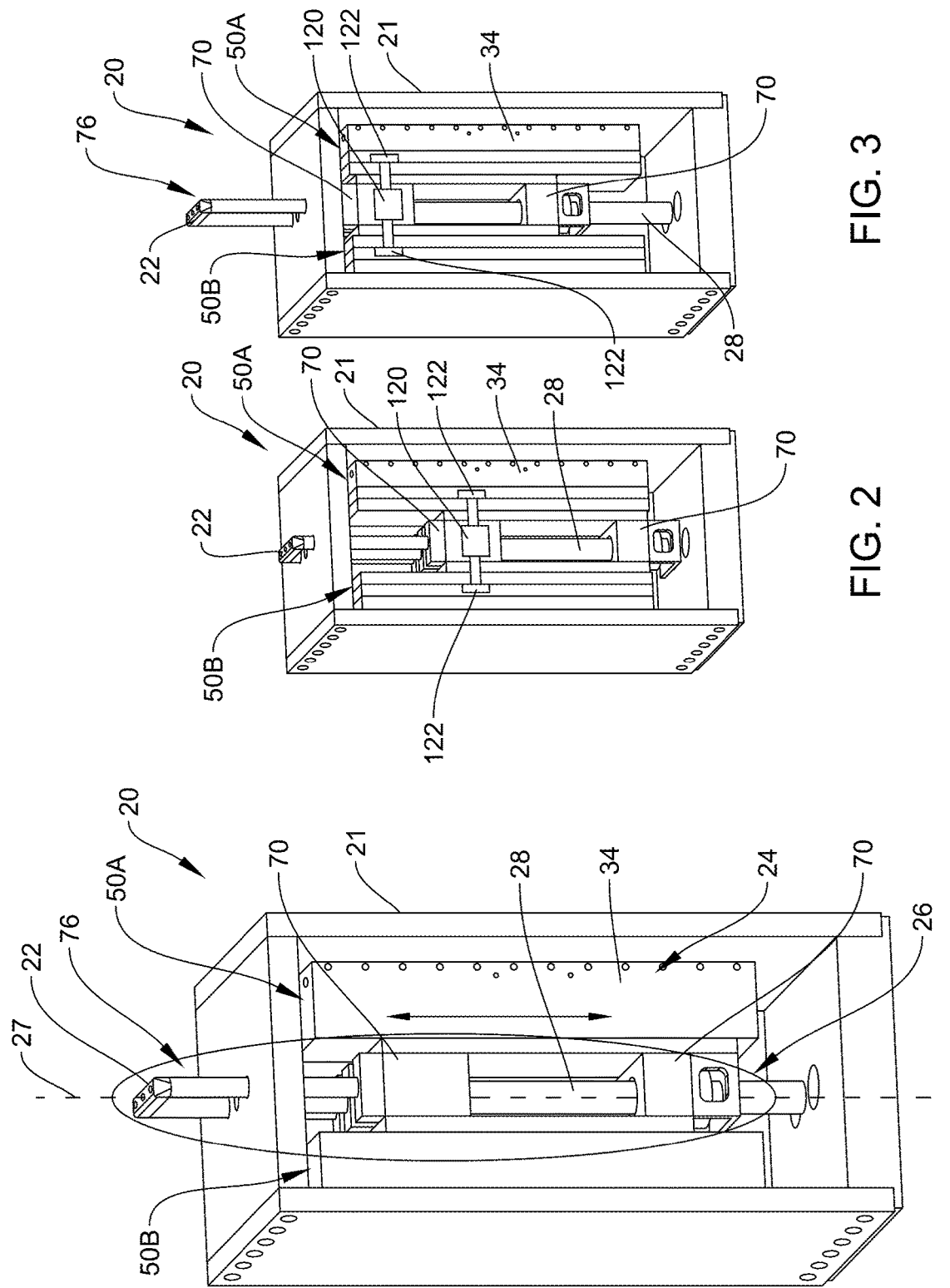

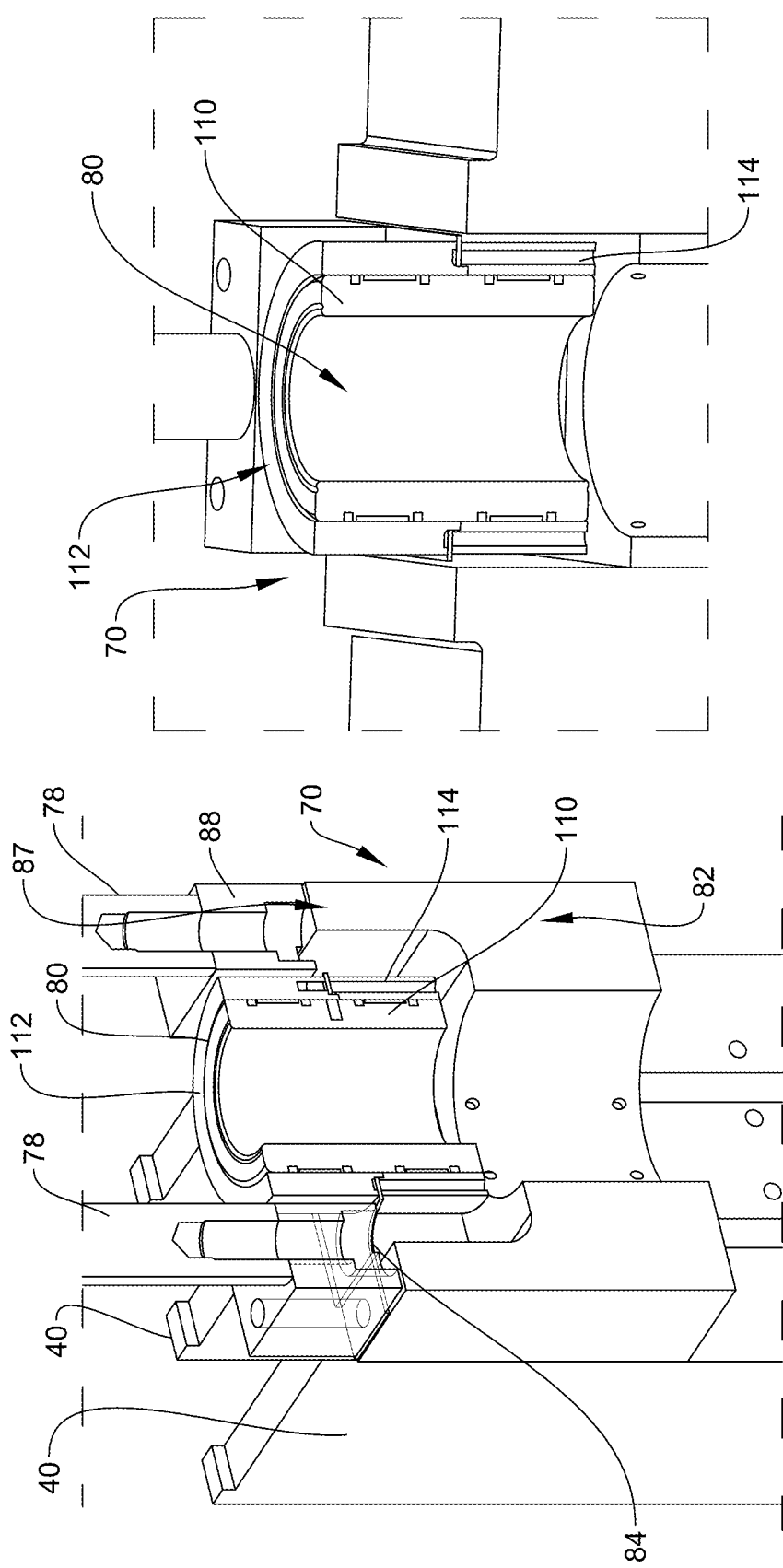

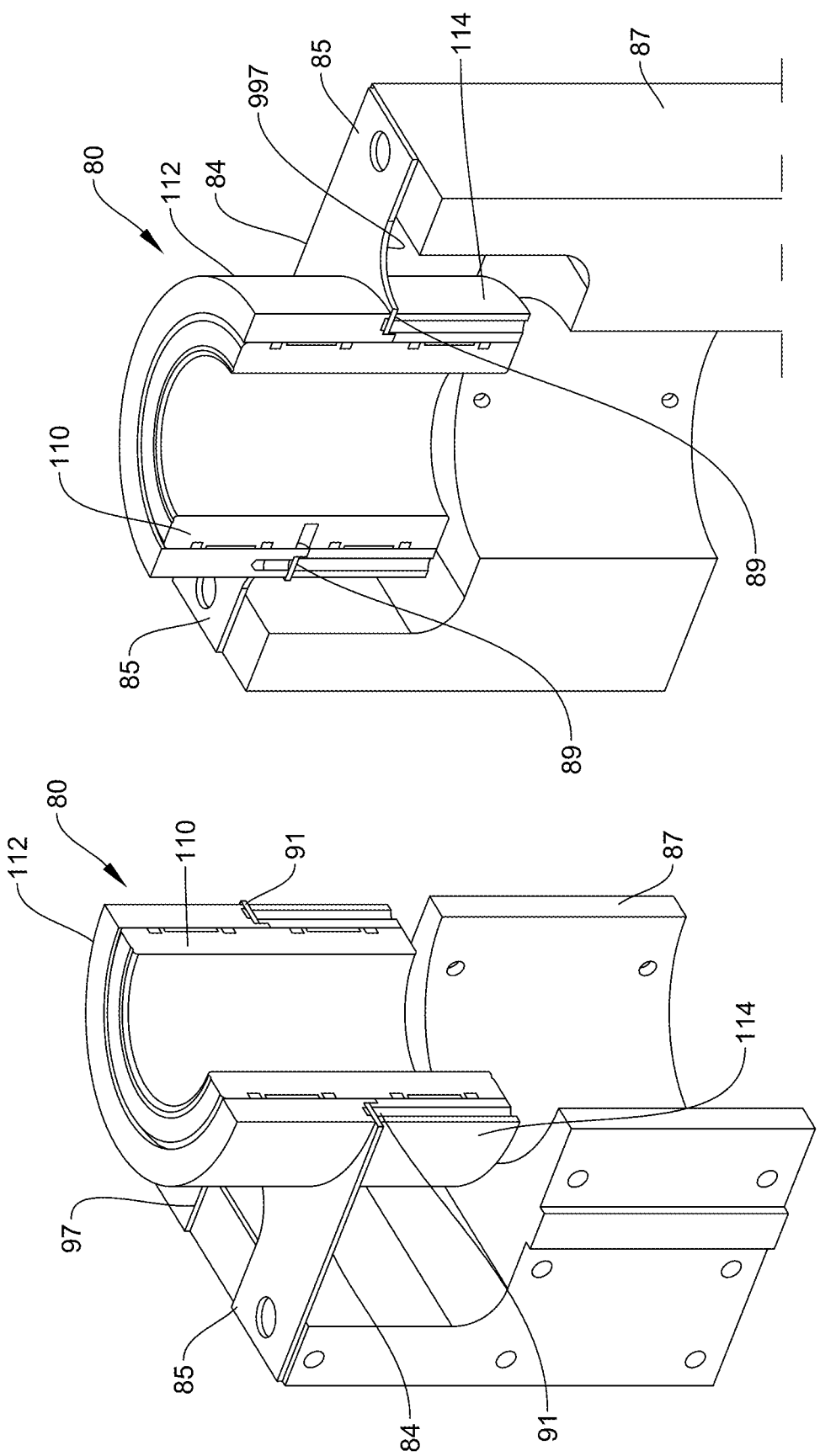

ELECTRIC ACTUATOR

CROSS-REFERENCE TO RELATED APPLICATION

The present application is based on and claims the benefit of U.S. provisional patent application Ser. No. 62/914,546, filed Oct. 13, 2019 and U.S. provisional patent application Ser. No. 63/090,597, filed Oct. 12, 2020, the contents of which are hereby incorporated by reference in their entirety.

BACKGROUND

The discussion below is merely provided for general background information and is not intended to be used as an aid in determining the scope of the claim subject matter.

Test machines or apparatus are used to test parameters and/or performance of materials, components, consumer products, and electronics as well as medical and other devices (i.e. test specimens). Typically test machines include one or more actuators to provide input loads and displacements.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

One general aspect includes an electric actuator for applying loads to a test specimen. The electric actuator includes a stationary support and a guide system having a single stationary guide joined to the stationary support having an axis. The actuator also includes a stationary assembly secured to the stationary support. A moving assembly is movable relative to the stationary support on the guide, where the moving assembly and the stationary assembly provide at least two sets of interacting magnetic fields disposed about the guide at equal angular intervals. A test specimen support is joined to the moving assembly and disposed on one side of the stationary support so as to move along the axis with movement of the moving assembly, the axis extending through the test specimen support.

Implementations of the foregoing aspect may include one or more of the following features. In one embodiment, the moving assembly may include coils, while the stationary assembly includes magnets. The moving assembly includes one and preferably a first and second bearing guided on the guide, the bearings being spaced apart from each other. The moving assembly may include planar coils supported by a support rail, the first bearing and second bearing being joined to the support rail. Each of the bearing and second bearing may include a bearing surface in direct or indirect contact with the guide, a bearing support and a flexure joining the bearing surface to the bearing support, the flexure being compliant for moments about axes orthogonal to the guide and stiff for forces along the axes orthogonal to the guide.

The electric actuator and may include a secondary force generating device coupled to the moving assembly. The guide may include a bore and the secondary force generating device can include a driven member movable in the bore. The secondary force generating device can be a spring such as a mechanical spring (compression, tension, etc). In addition, or in the alternative, the bore and driven member form a sealed chamber filled with a gas.

An anti-rotate bearing assembly can be coupled to the moving assembly and the stationary assembly. The anti-rotate bearing assembly may include a guide surface structure joined to the moving assembly to move therewith and a bearing element joined to the stationary component, or vice versa.

Another general aspect includes an electric actuator having a stationary support and a stationary guide joined to the stationary support. A stationary assembly is secured to the stationary support. A first bearing and a second bearing spaced apart from the first bearing are each guided on the guide. A moving assembly is secured to the first and second bearings and movable relative to the stationary support on the guide with the first and second bearings, where each bearing may include a bearing surface in direct or indirect contact with the guide, a bearing support and a movable coupling joining the bearing surface to the bearing support, the moving assembly being secured to each of the bearing supports Implementations of the foregoing aspect may include one or more of the following features. The electric actuator where the movable coupling is compliant for moments about axes orthogonal to the guide and stiff for forces along the axes orthogonal to the guide. The movable coupling may include a flexure.

BRIEF DESCRIPTION OF THE DRAWINGS

FIG. 1 is a perspective view of an electric actuator.

FIG. 2 is a perspective view of the electric actuator in a first position.

FIG. 3 is a perspective view of the electric actuator in a second position.

FIG. 7 is a perspective view of a bearing of the moving assembly with parts removed.

FIG. 8 is another perspective view of the bearing of the moving assembly with parts removed.

FIG. 10 is a perspective view of the bearing of FIG. 9 with parts removed.

FIG. 11 is another perspective view of the bearing of FIG. 9 with parts removed.

DETAILED DESCRIPTION OF THE ILLUSTRATIVE EMBODIMENT

Figures 4, 5:
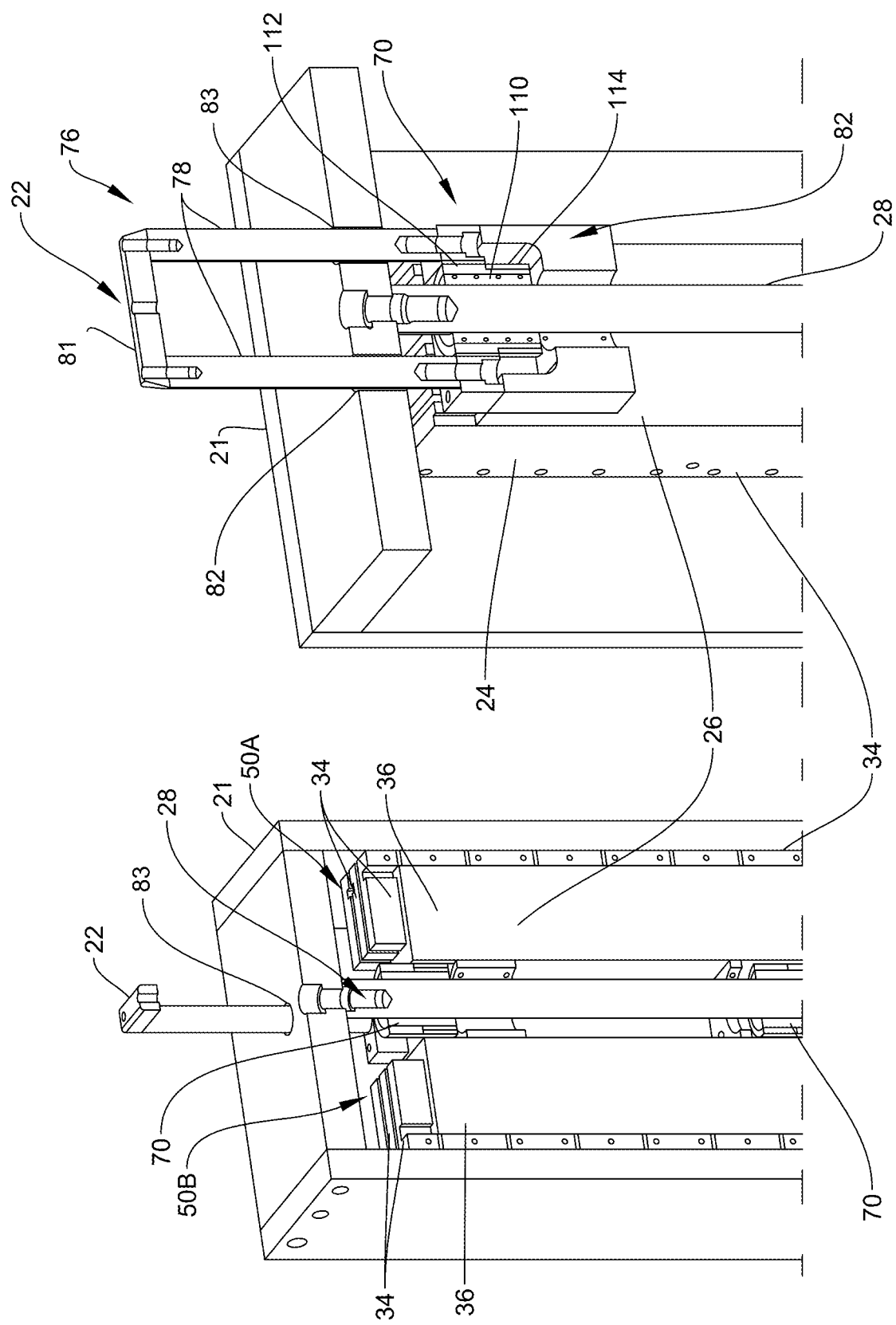
FIG. 4 is a partial perspective view of the electric actuator with parts removed.
FIG. 5 is another partial perspective view of the electric actuator with parts removed.

The present disclosure provides an electric actuator 20 capable of linear displacement. The actuator 20 can be used for many different applications. In one non-limiting but advantageous embodiment, the electric actuator 20 is provided in a testing machine to impart desired loads or displacements to a test specimen such as but not limited to a damper. Such test machines are well known and in one embodiment the testing machine includes a crosshead that is moveable on vertical columns by a crosshead drive (motor, gear reducer, drive belts, etc.), where the columns in turn are supported by a base. An electric actuator 20 illustrated in FIGS. 1-3 having aspects herein described is mounted typically in, but not limited to, the base of the testing machine but it could also be mounted in the crosshead. In an alternative embodiment, the testing machine can be of size to be supported by a table top. It should be understood, actuator 20 can be oriented as needed given the application in which it is used. As appreciated by those skilled in the art, components of the electric actuator 20 described below can be of size as necessary to impart the desired loads.

Generally, actuator 20 includes a stationary support or frame 21, a stationary assembly 24 mounted to the stationary support 21 and a moving assembly 26 that moves relative to the stationary assembly 24 though interaction of magnetic fields, the moving assembly 26 moving along an axis 27 defined by a stationary guide 28. In actuator 20, the guide 28 comprises, preferably, a single stationary guide such as a rod being fixed at each end to the support 21. By using only a single stationary guide rod 28 upon which at least one bearing is guided, the guiding system (guide rod/bearing(s)) is not overconstrained for linear movement along axis 27. In conventional actuators two or more spaced apart guide assemblies move along spaced apart guide paths or axes. The spaced apart guide paths realize an overconstrained guide system because two or more guide paths are provided for the single linear guided movement of the moving member in the actuator. Difficulties exist in operation of such an actuator because the guide paths or axes are often not perfectly parallel to each other, or can easily become askew or non-parallel, for example due to shipment of the actuator, thermal expansion of elements of the actuator, and/or normal wear. These problems are minimized due to the use of a single guide rod 28.

Preferably, actuator 20 includes at least two sets of interacting magnetic fields where a first set of interacting magnetic fields is disposed on one side of the axis 27 and guide 28, and a second set of interacting magnetic fields is disposed on an opposite side (i.e. 180 degrees about the axis 27). Each set of interacting magnetic fields includes a stationary component 34 forming part of the stationary assembly 24 and a moving component 36 forming part of the moving assembly 26. At least one of the stationary component 34 and the moving component 36 of each associated pair are coils having turns that can be selectively energized, while the other of the stationary component 34 and the associated moving component 36 can be formed from permanent magnets or other coils. In the embodiment illustrated, each of the moving components 36 are coils, while each of the stationary components 34 comprises a plurality of magnets arranged in a successive manner so as to be parallel to axis 27 and guide 28. Since the moving component coils 36 are of less mass than the stationary component magnets 34, the actuator 20 can have better response, although this arrangement of coils and magnets should not be considered limiting.

Figure 6:
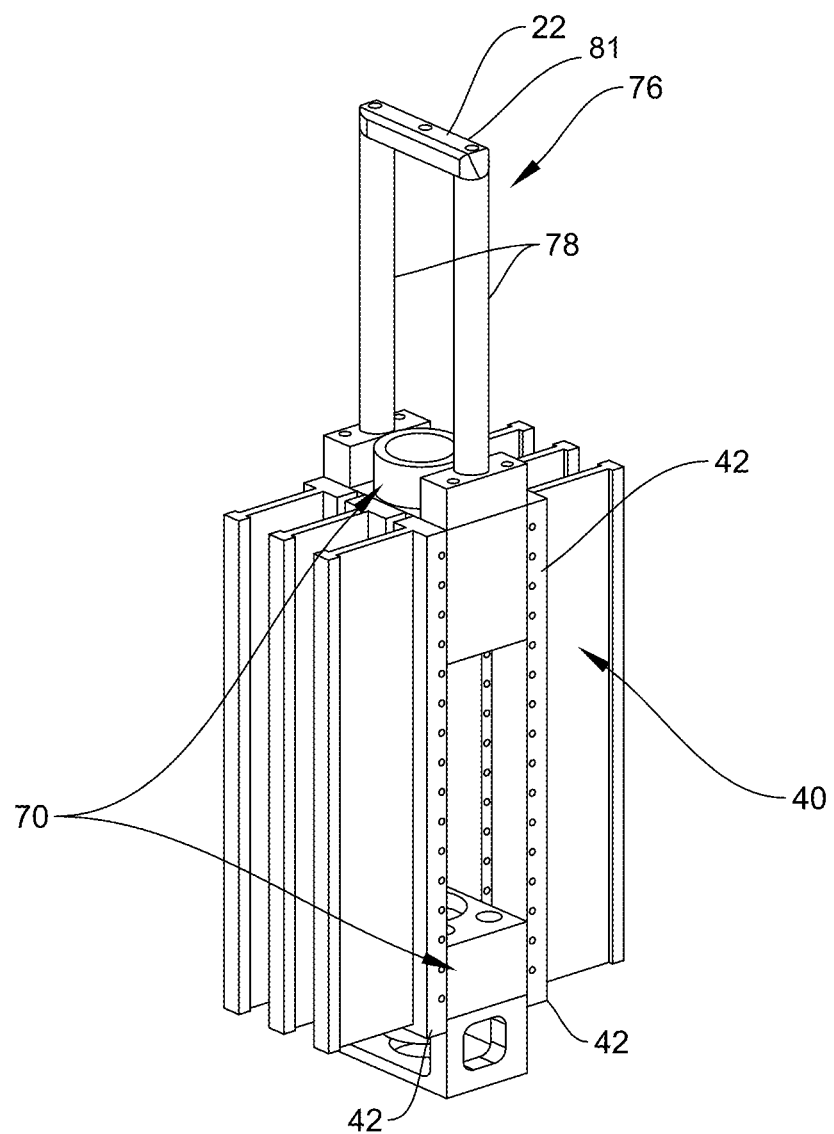
FIG. 6 is a perspective view of a moving assembly.
Figure 14:
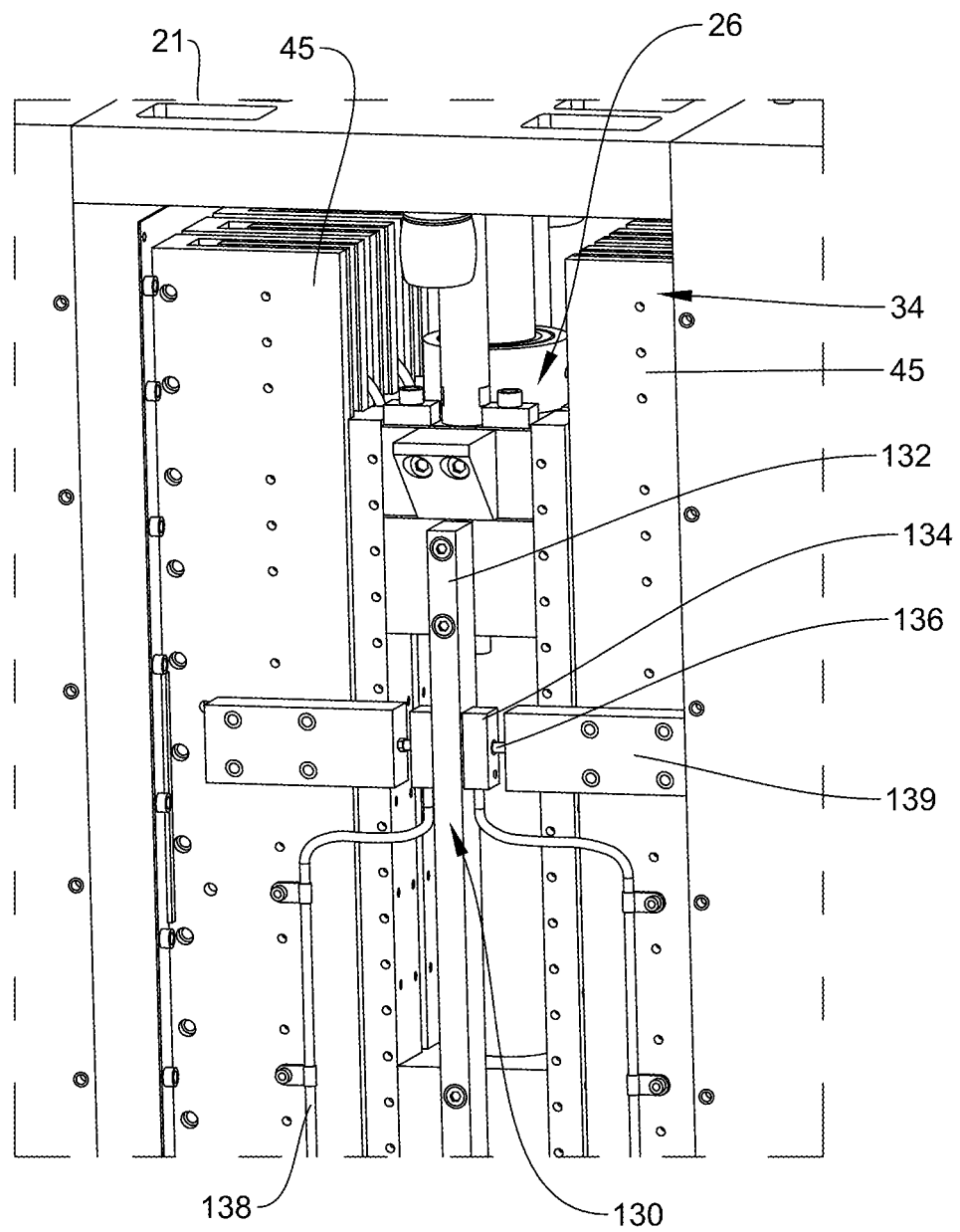
FIG. 14 is another partial perspective view of the electric actuator.

Referring to FIGS. 6 and 14, the coils of each moving component 36 are in the form of a generally planer blade 40 wherein the coils are supported on a planar support 41 having a support rail 42 being stiffer than the planer support 41. In one embodiment, the planar support 41 and support rail 42 are separate components, possibly made of different materials, joined together. However, in an alternative embodiment, such as best illustrated in FIG. 14, the planar support 41 and rail 42 are integrally formed together from a single unitary body.

In the embodiment illustrated, each associated stationary component 34 includes at least one and preferably two sets of magnets 43, where a first set of magnets 43A is arranged to face a first major surface of planar support 41 and a second set of magnets 43B is arranged to face a second major surface of planar support 41 that faces in a direction opposite to the first major surface. It should be noted that a single set of coils can be provided on the planar support 41 so as to magnetically couple with both the first and second set of magnets 43A. 43B. Alternatively, the planar support 41 can support a first set of coils to be on one side of the planar support 41 so as to face the first set of magnets 43A and a second set of coils on the opposite side of the planar support 41 so as to face the second set of magnets 43B. Each set of magnets is mounted to an extending support member 45A, 45B of a U-shaped support frame 45, where a center section 45C of the U-shaped support frame 45 is secured to the support 21. Herein a "magnetic coupling unit" is the magnetic component(s) (magnets or coils) on each planar support 41 that magnetic couples to its associated magnetic component(s) (magnets or coils) on the stationary component 34 like provided by each U-shaped support frames 45.

Figure 15:
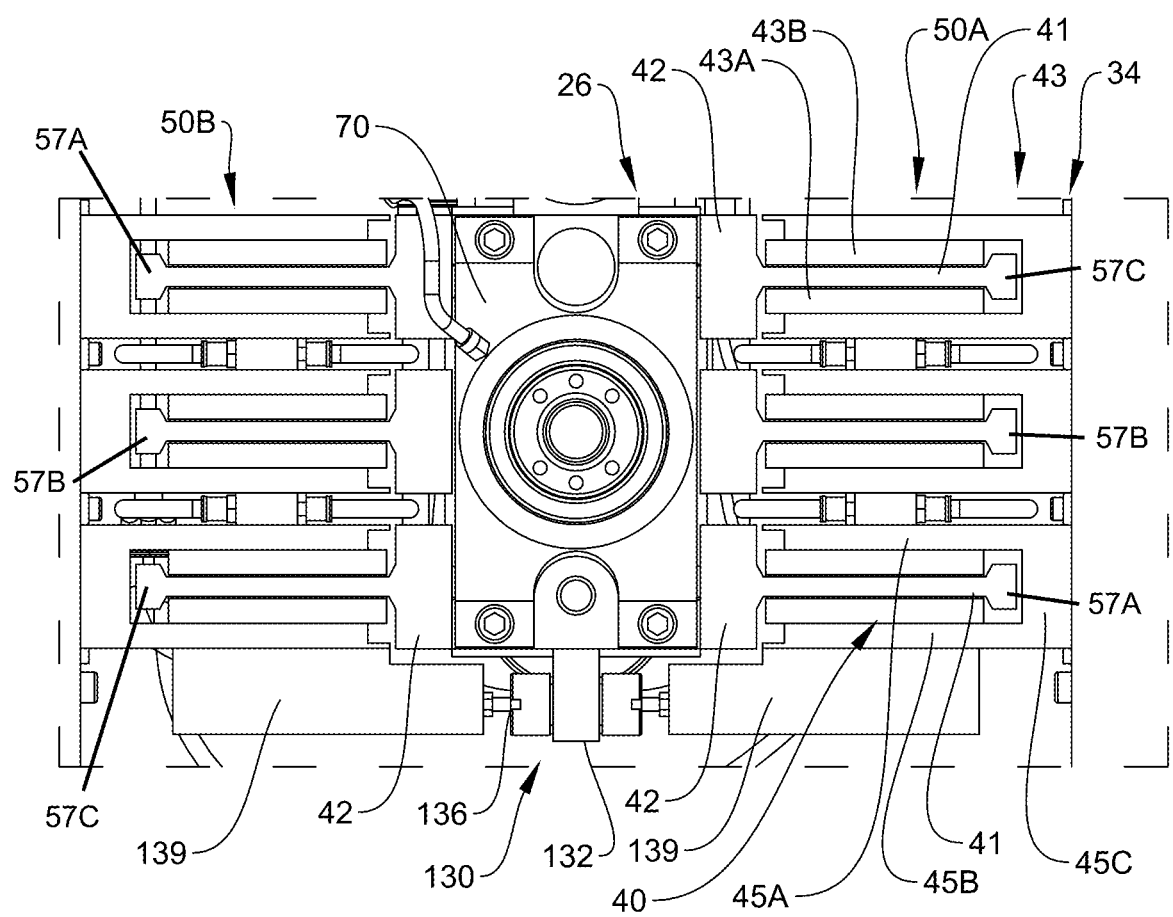
FIG. 15 is a partial top-plan view of the electric actuator with parts removed.

Like the planar support 41, the support members 45A, 45B and center section 45C of support frames 45 can be formed of individual parts joined together or formed integrally from a single unitary body. In the exemplary embodiment, the stationary components 34 and corresponding moving components 36 are arranged in pairs on opposite sides of axis 27, where, as illustrated in FIG. 14, three pairs of stationary components 34 and moving components 36 (or six separate magnetically coupled operating units, a magnetically coupled operating unit being a single stationary component 34 and moving component 36) are present with a first set of magnetically coupled operating units at 50A generally on one side of the axis 27 and a second set of magnetically coupled operating units at 50B generally on the opposite side of the axis 27 so as to not induce any unbalanced loads relative to the axis; however, this should not be considered limiting in that more or less than three pairs can be present depending on the operating specifications desired. Furthermore, in yet another alternative embodiment, it should be noted that sets of magnetically coupled operating units like set 50A can be disposed about the axis 27 at equal angular intervals again so as to not induce any unbalanced loads relative to the axis. For example, three sets of magnetically coupled operating units can be arranged about axis 27 so as to be spaced essentially 120 degrees apart from each other. Generally, if there are multiple planar supports in each magnetically coupled operating unit, then there would be multiple sets of equally spaced apart planar supports (each set comprising a planar support from each of sets of magnetically coupled operating units) that are equally spaced apart about the axis 27, the stationary component supporting the associated magnetic components in like manner. Hence, for two sets of magnetically coupled operating units 50A, 50B as illustrated in FIG. 15, each set having three planar supports 41 (blades 40), the number of multiple sets of equally spaced apart planar supports would be three, where the first set comprises planar supports 57A, the second set comprises planar supports 57B and the third set comprises planar supports 57C. The moving component 36 in the form of blade 40 and stationary component 34 in the form of U-shaped magnetic tracks are available from Aerotech. Inc. of Pittsburgh. Pennsylvania, USA.

As indicated above, the moving assembly 26 is guided by guide 28 herein embodied as a guide rod. In particular, the moving assembly 26 includes at least one and in one embodiment two bearing assemblies 70 movable with respect to guide rod 28. In a preferred embodiment the bearing assemblies 70 comprise first and second bearing assemblies that are spaced apart from each other, each being connected only to the support rail(s) 42 of the moving components 36 rather than a separate structure apart from the support rail(s) 42. In this manner, since there is no additional structure connecting the bearings 70 together other than blades 40, the mass of the moving assembly 26 is advantageously reduced.

The moving assembly 26 further includes a test specimen support 76 to which the specimen is connected at end 22. The test specimen support 76 extends beyond the stationary assembly 24 or support 21 thereof. In the exemplary embodiment the specimen support 76 includes two support rods 78 and a cross member 81 forming the end 22. At ends opposite the cross member 81, the support rods 78 are joined to one of the bearing assemblies 70, while the support rods 78 extend through apertures 83 in support 21. Since the specimen support 76 and bearing assembly 70 are secured to each other to move together, the side load capacity of the actuator 20 does not vary with the extension of the specimen support 76 from the support 21 as would be the case in a conventional actuator where the bearing assemblies are fixed to the corresponding mount. In this manner, the side load capacity is advantageously constant over the entire length of travel of the moving assembly 26. Preferably, the test specimen support 76 is configured such that the axis 27 extends through the test specimen support 76 such that the test specimen attached thereto is centered on the axis 27 and the support rods 78 are equally spaced about the axis 27 if a plurality of support rods 78 are used. In an alternative embodiment, the support rods can replaced by a single element such as a rod, cylinder or the like centered on the axis 27 and extending from one of the bearing assemblies 70 along the axis 27 away from both of the bearing assemblies 70, or from the stationary support 21.

Figure 9:
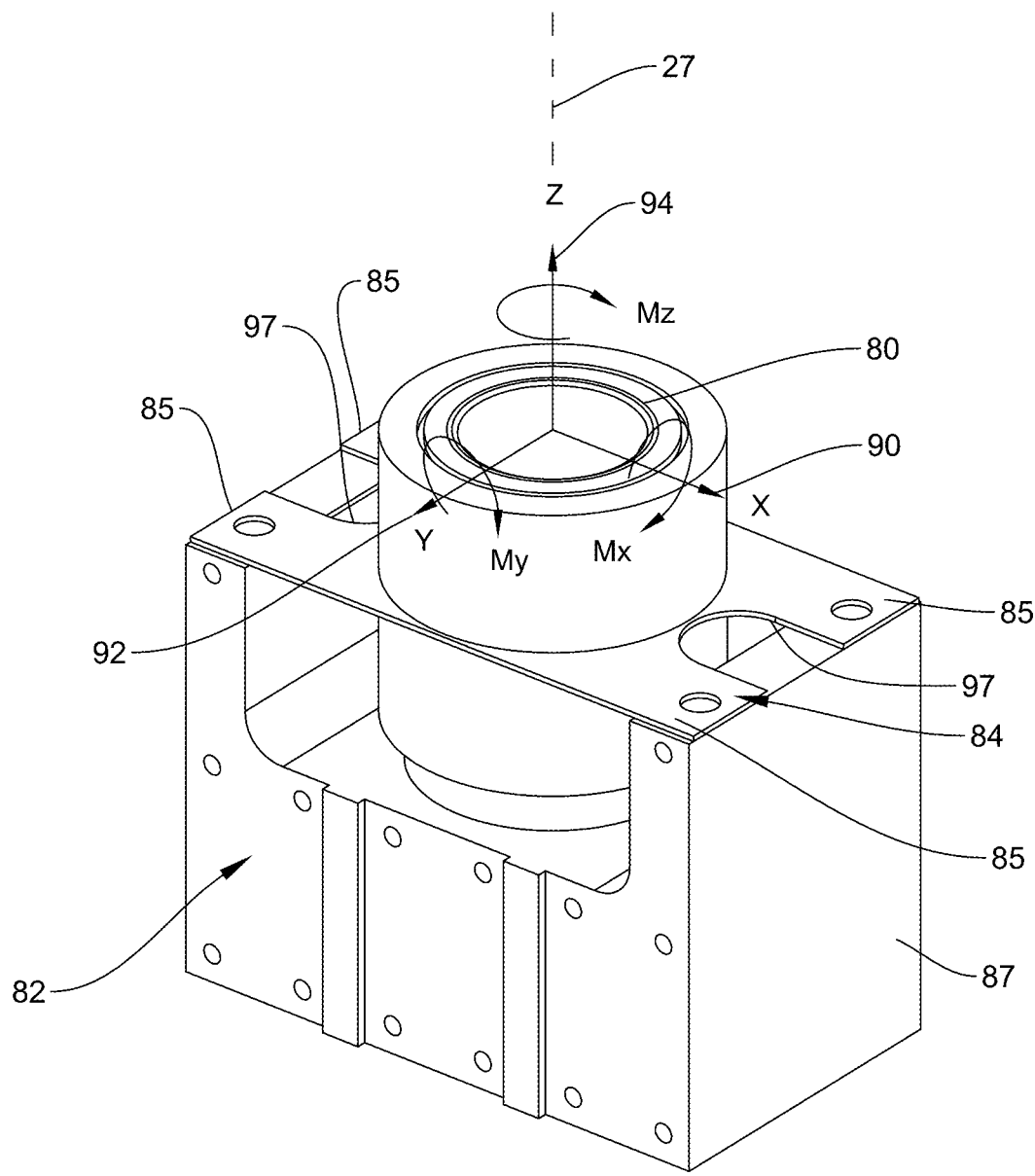
FIG. 9 is a perspective view of the bearing.

FIGS. 7-9 illustrate an advantageous structure for each of the first and second bearing assemblies 70, in particular connection of a bearing 80 (that is in direct or indirect contact with the guide rod 28) with a bearing support 82 using a movable coupling 84 herein a flexure. Bearing support 82 is secured to the support rail(s) 42, where the specimen support 76 is also joined to the upper bearing support 82.

Bearings 80 provide a bearing surface, capable of reacting radial loads, necessary for providing a guidance system for typical electric actuators used in characterization testing. However, the flexure 84 provides a mechanical means of locating the bearing surfaces co-linear with the guide rod 28 even during instances of guide rod bending.

Referring to FIG. 9, flexure 84 is configured so as to be substantially stiff for linear forces along axes 90 ("x") and 92 ("y"), which are both orthogonal to axis 27, as well as along axis 94 ("z"). However, flexure 84 is compliant for moments about axes 90 and 92. This enables the bearing 80 to rotate as necessary with any bending of guide rod 28. In the embodiment illustrated, flexure 84 is planer having a central aperture through which guide rod 28 extends. Arms 85 mount the flexure to the bearing support 82, for example being located between portions 87 and 88 of bearing support 82 that are joined together. A cutout 97 is provided between the arms 85 at each end of the flexure 84. With the enlarged aperture for the guide rod 28, the cutouts 97 provide small portions 89 (FIG. 10) of the flexure 84 along axis 90 that function as pivots. Likewise, a width of the flexure 84 is selected such that the enlarged aperture for the guide rod 28 also forms small portions 91 (FIG. 11) that also function as pivots along the axis 92. In a preferred embodiment, the bearings 80 are mounted to the flexures 84 through the centroid of each bearing 80. The flexures 84 have a moment bending stiffness significantly less than the pitch stiffness of the bearings 80.

Figure 13:
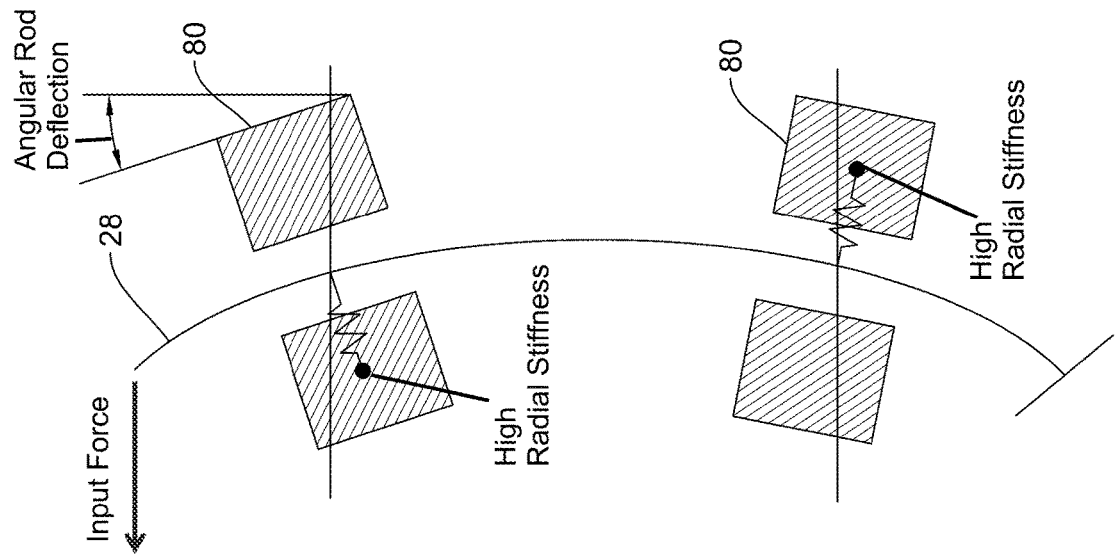
FIG. 13 is a schematic diagram of the bearings and the guide where the bearings compensate for bending motion of the guide.

Guide rod 28 and bearings 80 are schematically illustrated in an exaggerated manner in FIG. 13. When a side load is present from specimen loading, the side load is transferred through the bearings 80 and reacted at the guide rod 28. The reacted loads at the guide rod 28 can cause lateral and angular deflection of the guide rod 28 as illustrated in FIG. 13. However, given the low moment stiffness of the flexure 84 relative to the pitch stiffness of the bearing 80 for moments about axes 90 and 92, the bearing surface in direct or indirect contact with the guide rod 28 is capable of following the angular deflection of the guide rod 28. This results in the bearing surface maintaining substantial co-linearity with the guide rod 28 along the length of the bearing 80, thus providing optimal bearing load capacity to react the external radial side loads.

Figure 12:
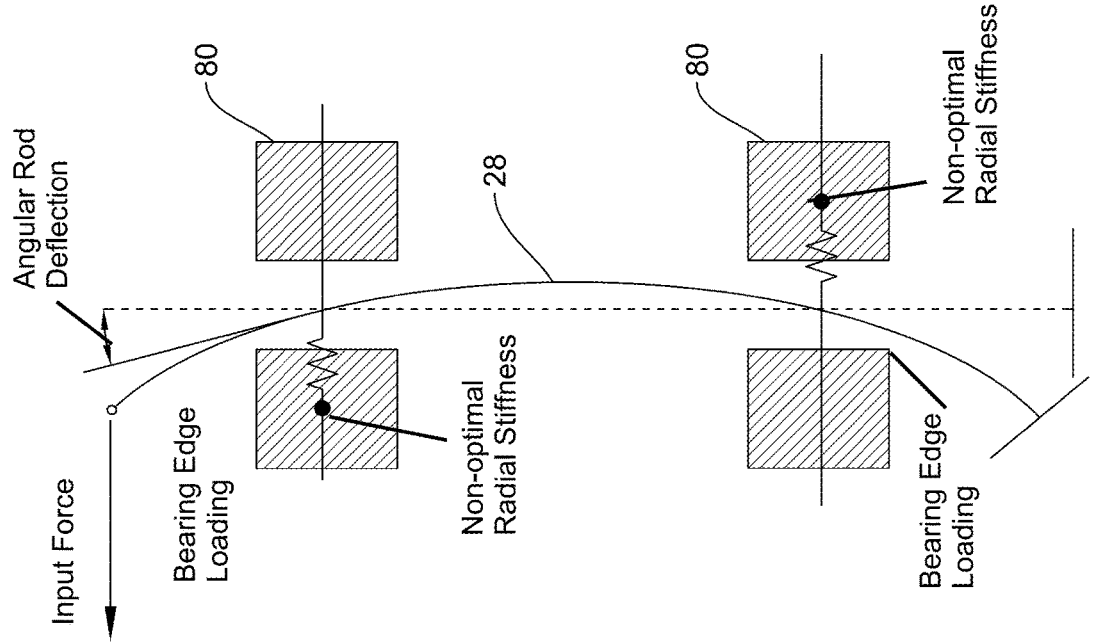
FIG. 12 is a schematic diagram of bearings movable on a guide without compensation provided to the bearings for bending motion of the guide.

FIG. 12 schematically illustrates what can happen when flexures 84 are not present. In such a structure, the guide rod 28 bends but since the bearings 80 do not rotate, bearing edge loading can be present, which can significantly decrease the side load rating of the actuator.

It should be noted that the bearing 80 can take any number of conventional forms such as but not limited to contact bearing surfaces (rotating or non-rotating) with or without lubricants. However, in a preferred embodiment, bearings 80 can comprise air bearings that provide a frictionless, non-contact air bearing surface. Referring to FIGS. 10 and 11, a cylindrical porous air bushing 110 is of size so as to be positioned proximate the outer surface of the guide rod 28. Upper and lower outer bearing housings 112, 114 surround the air bushing 110 and are secured together clamping an annular portion of the flexure 84 therebetween. Such bearings are sold by Newway Air Bearings of Aston, Pennsylvania, USA.

Referring back to FIGS. 2 and 3 an anti-rotate bearing assembly 120 is preferably provided to inhibit rotation of the moving assembly 26 about axis 27 due to the guide 28 being a rod and the bearings 70 having cylindrical surfaces. Generally, the anti-rotate bearing assembly 120 and an alternative described below are radially offset from axis 27 and does not produce an over-constrained guide structure. In the embodiment illustrated, bearing assembly 120 includes bearing elements 122 such as a rolling element or bushing in direct or, preferably indirect (e.g. air bearing bushing) contact with guide surfaces parallel to the axis 27. In FIGS. 2 and 3, the bearing elements 122 are joined to the moving assembly 26 to move therewith, while stationary guide surfaces are present on the stationary assembly 24.

FIGS. 14 and 15 illustrate another anti-rotate bearing assembly 130. Anti-rotate bearing assembly 130 includes a guide surface structure 132 such as a rail or plate joined to the moving assembly 26 to move therewith, while bearing elements 134 are secured to the stationary assembly 24, preferably on opposite sides of the guide surface structure 132. Preferably, the bearing elements 134 are mounted on a swivel coupling 136 that in turn are fixed to the stationary assembly 24 with mounts 139. If embodied as air-bushings, air supply hoses 138 supply air or other gas to the bearing elements 134 from a source not shown. Anti-rotate bearing assembly 130 may be preferable over anti-rotate bearing assembly 120 because the air supply hoses 138 do not have to move or flex with movement of the moving assembly 26.

Figure 16:
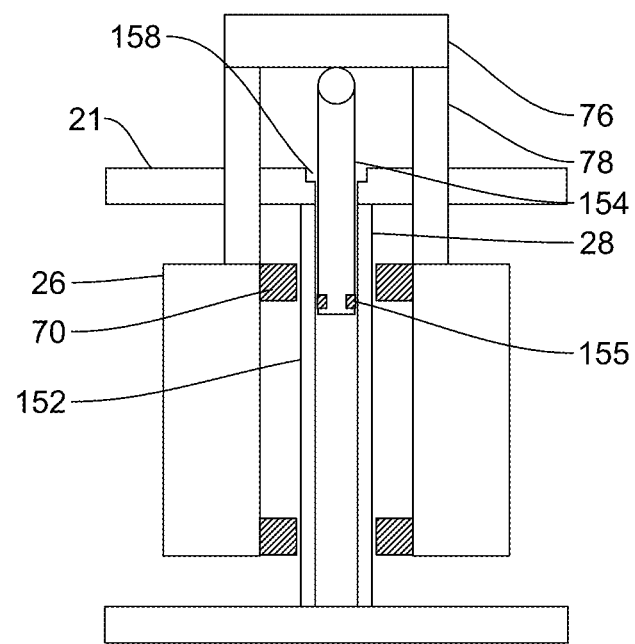
FIG. 16 is a schematic diagram of an electric actuator with a second force-generating device.
Figure 17:
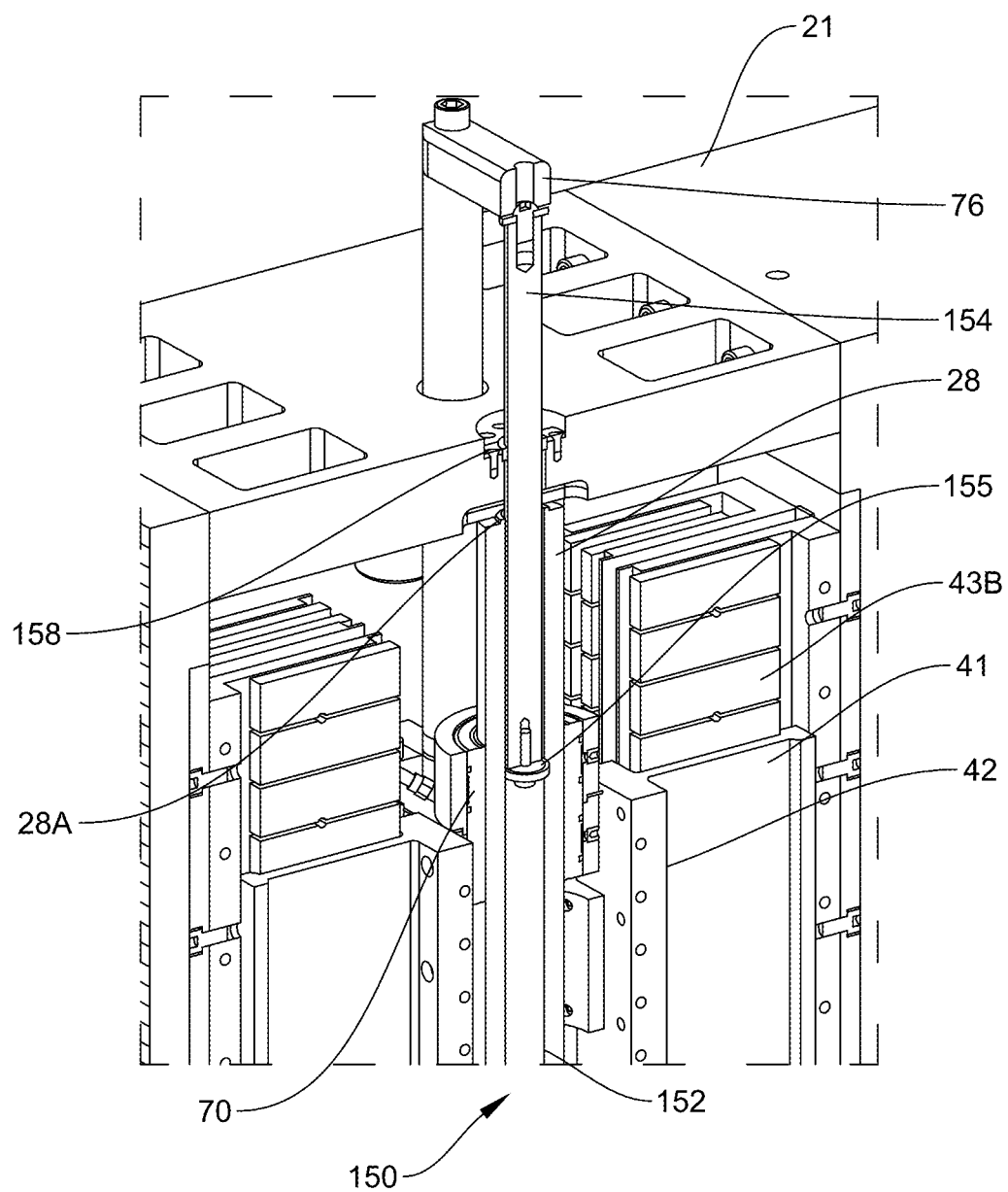
FIG. 17 is a partial perspective view of the electric actuator with the second force-generating device.

Air core linear electric actuators have a tendency to overheat if a high continuous force is generated. Therefore, in one embodiment, a secondary force generating device 150 illustrated in FIGS. 15 and 16 is provided to handle the static, or continuous forces desired from actuator 20. Generally, the secondary force generating device 150 comprises a spring or other force generating component to provide a force upward upon the moving assembly 26 against the force of gravity. In one embodiment, the guide rod 28 includes a cavity or bore 152 where the spring or other force generating component is located and a driven member 154 that is operably coupled to the spring or other force generating component and the moving assembly 26. The driven member 154 herein embodied as a rod extends through an aperture 28A in the guide rod 28 (and aperture 158 in support 21) and engages specimen support 76 in a fixed manner or via a coupling that allows at least limited movement orthogonally with respect to axis 27 so as again not to contribute to an over-constrained guided structure. The driven member 154 can be permanently secured to specimen support 76 to always move therewith with movement along axis 27 or in a decouplable manner such that the moving assembly 26 does not include the mass of the driven member 154 during at least some movements.

The secondary force generating device 150 can comprise a mechanical spring located in cavity or bore 152 and/or the cavity or bore 152 can function as a cylinder and the driven member 154 as a piston movable in the cylinder with seals provided at 155. Mechanical springs add mass, friction, and have potential for undesirable resonances. Piston-cylinder arrangements can be pneumatic, oil over nitrogen, etc. Oil over nitrogen systems add oil inertia (moving mass) and the need for an oil pressure control system and the potential for leaks, etc. Air pressurization systems are typically only used up to about 100 psi (to avoid self-combustion if there happens to be a fuel source present). A nitrogen pressure based system allows for higher operating pressures, where leaks, if any, in a ventilated or unconfined environment is generally not a problem. Although illustrated as a single ended piston it should be noted a doubled ended piston rod with springs effectively created in the cylinder above and below allow for bi-directional static support loading.

Although various embodiments and examples have been illustrated and described herein, this disclosure is illustrative only, and changes may be made in detail in matters of structure, arrangement, and methods without departing from the scope of the present disclosure.

What is claimed is:

1. An electric actuator for applying loads to a test specimen, the electric actuator comprising:
   a stationary support;
   a guide system comprising a single stationary guide secured at opposite ends to the stationary support and having an axis extending through the single stationary guide;
   a stationary assembly secured to the stationary support;
   a moving assembly movable relative to the stationary support on the single stationary guide, wherein the moving assembly and the stationary assembly provide at least two sets of interacting magnetic fields disposed about the single stationary guide and the axis at equal angular intervals; and
   a test specimen support joined to the moving assembly and disposed on one side of the stationary support so as to move along the axis with movement of the moving assembly, the axis extending through the test specimen support.

2. The electric actuator of claim 1, wherein the moving assembly comprises coils.

3. The electric actuator claim 1, wherein the stationary assembly comprise magnets.

4. The electric actuator of claim 1, wherein the moving assembly comprises a bearing guided on the single stationary guide.

5. The electric actuator of claim 4, wherein the moving assembly comprises a second bearing guided on the single stationary guide, the second bearing being spaced apart from the bearing.

6. The electric actuator of claim 5, wherein the moving assembly comprises coils supported by a support rail, the bearing and second bearing being joined to the support rail.

7. The electric actuator of claim 5, wherein each of the bearing and second bearing comprise a bearing surface in direct or indirect contact with the single stationary guide, a bearing support and a flexure joining the bearing surface to the bearing support, the flexure being compliant for moments about axes orthogonal to the single stationary guide and stiff for forces along the axes orthogonal to the single stationary guide.

8. The electric actuator of claim 1, and further comprising a secondary force generating device coupled to the moving assembly.

9. The electric actuator of claim 8, wherein the single stationary guide comprises a bore and the secondary force generating device includes a driven member movable in the bore.

10. The electric actuator of claim 9, wherein the secondary force generating device is a spring.

11. The electric actuator of claim 10, wherein the single stationary guide and the bore comprise a cylinder and the driven member is a piston movable in the cylinder.

12. The electric actuator of claim 1, and further comprising an anti-rotate bearing assembly coupled to the moving assembly and the stationary assembly.

13. The electric actuator of claim 12, wherein the anti-rotate bearing assembly comprises a guide surface structure joined to the moving assembly to move therewith and a bearing element joined to the stationary component.

14. The electric actuator of claim 1, wherein the moving assembly comprises a bearing guided on the single stationary guide, the bearing comprising a bearing surface in direct or indirect contact with the single stationary guide, a bearing support and a movable coupling joining the bearing surface to the bearing support, the movable coupling being compliant for moments about axes orthogonal to the single stationary guide and stiff for forces along the axes orthogonal to the single stationary guide.

15. The electric actuator of claim 14, wherein the movable coupling comprises a flexure.

16. An electric actuator comprising:
- a stationary support;
- a stationary guide secured at opposite ends to the stationary support and having an axis extending through the stationary guide;
- a stationary assembly secured to the stationary support;
- a first bearing and a second bearing spaced apart from the first bearing, each bearing guided on the stationary guide; and
- a moving assembly secured to the first and second bearings and movable relative to the stationary support on the stationary guide with the first and second bearings, wherein each bearing comprise a bearing surface in direct or indirect contact with the stationary guide, a bearing support and a movable coupling joining the bearing surface to the bearing support, the moving assembly being secured to each of the bearing supports.

17. The electric actuator of claim 16, wherein the movable coupling is compliant for moments about axes orthogonal to the stationary guide and stiff for forces along the axes orthogonal to the stationary guide.

18. The electric actuator of claim 17, wherein the movable coupling comprises a flexure.

19. The electric actuator of claim 16, wherein the movable coupling comprises a flexure.

\* \* \* \* \*